Jan. 3, 1961 H. NARAGHI 2,966,884

EGG GATHERING APPARATUS FOR A POULTRY CAGE BATTERY

Filed July 30, 1958 3 Sheets-Sheet 1

INVENTOR.
Hashem Naraghi
BY Webster & Webster
ATTYS.

Jan. 3, 1961 H. NARAGHI 2,966,884

EGG GATHERING APPARATUS FOR A POULTRY CAGE BATTERY

Filed July 30, 1958 3 Sheets-Sheet 2

INVENTOR.
Hashem Naraghi
BY Webster & Webster
ATTYS.

Jan. 3, 1961 H. NARAGHI 2,966,884

EGG GATHERING APPARATUS FOR A POULTRY CAGE BATTERY

Filed July 30, 1958 3 Sheets-Sheet 3

INVENTOR.
Hashem Naraghi
BY Webster & Webster
ATTYS.

United States Patent Office 2,966,884
Patented Jan. 3, 1961

2,966,884

EGG GATHERING APPARATUS FOR A POULTRY CAGE BATTERY

Hashem Naraghi, Rte. 2, Box 750, Escalon, Calif.

Filed July 30, 1958, Ser. No. 752,083
8 Claims. (Cl. 119—22)

This invention relates to poultry-cage batteries of the type in which a plurality of individual poultry cages are arranged in a horizontal row and having a trough in front of and common to all the cages, and into which trough all eggs as laid by the fowls in the cages roll of themselves from the floor of said cages.

The principal object of the present invention is to provide automatically functioning means to engage any and all eggs resting in said trough, and to sweep and roll the eggs onto an adjacent tray removably supported on a traveling carriage.

A further object of the invention is to provide an egg sweep so constructed that the eggs cannot be harmed by contact therewith, and to arrange the tray in relation to the trough so that the eggs being transferred from the trough to the tray will not be subjected to any drop or fall which might possibly cause any cracking of the egg shells.

Another object of the invention is to mount the tray on the traveling carriage so that eggs swept onto the tray will immediately roll of themselves away from the entry area of the tray and be out of the path of movement of eggs subsequently swept onto the tray.

It is also an object of the invention to provide egg gathering apparatus, for a poultry cage battery, which is designed for ease and economy of manufacture, simplicity of installation, and long service with a minimum of maintenance or repair.

An additional object of the invention is to provide a practical, reliable, and durable egg gathering apparatus, for a poultry cage battery, which will be exceedingly effective for the purpose for which it is designed.

These objects are accomplished by means of such structure and relative arrangement of parts as will fully appear by a perusal of the following specification and claims.

Referring now more particularly to the drawings, and to the characters of reference marked thereon, the poultry cages, in a structure of the type to which the present invention is related, are arranged in horizontal tiers, indicated at 1 and 2; said tiers being spaced apart vertically somewhat and each tier having a battery of individual cages 3 disposed in side by side relation.

Figure 1:
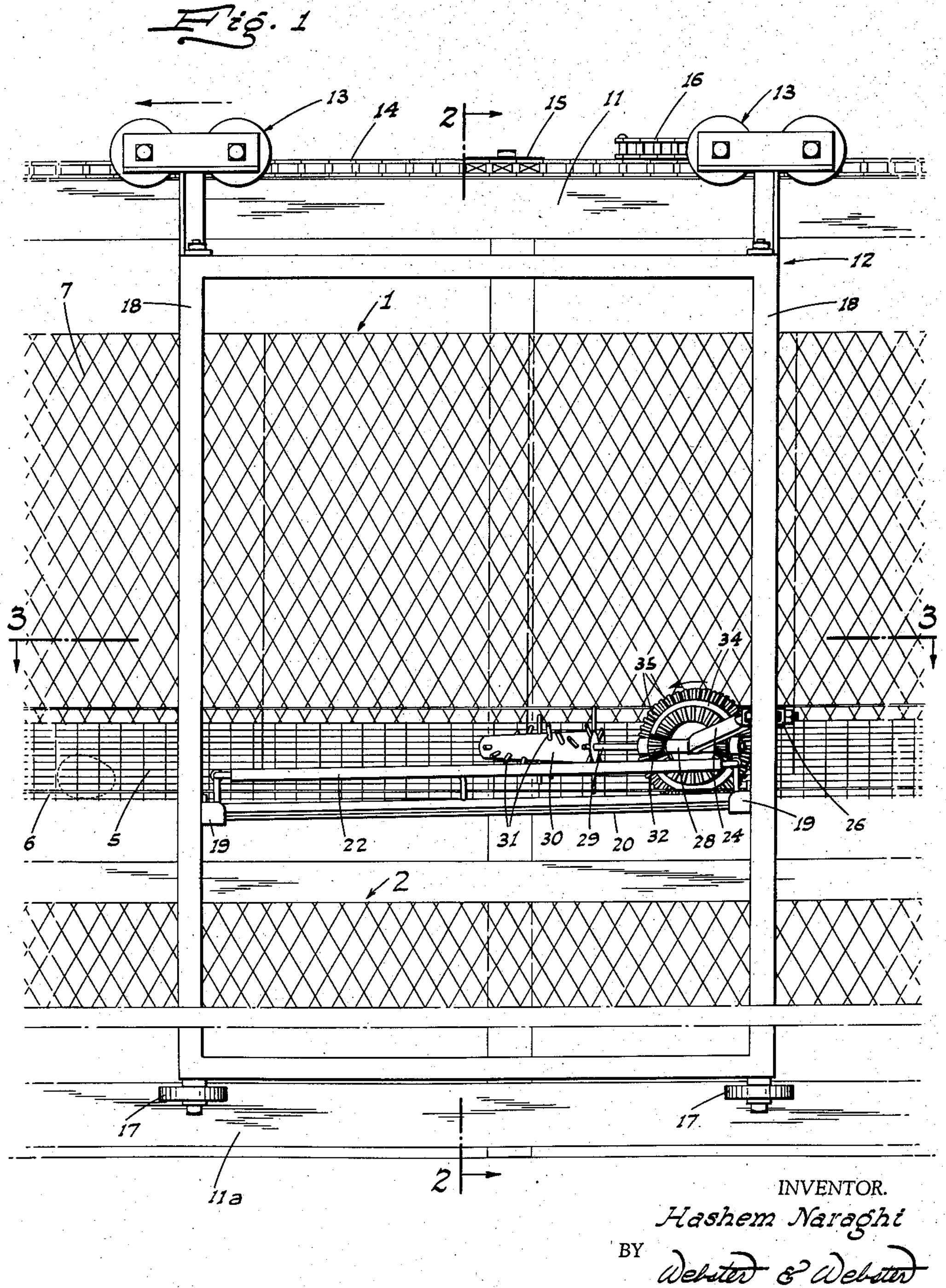
Fig. 1 is a fragmentary front view of a battery of poultry cages, showing my improved egg gathering apparatus mounted in connection therewith.
Figure 2:
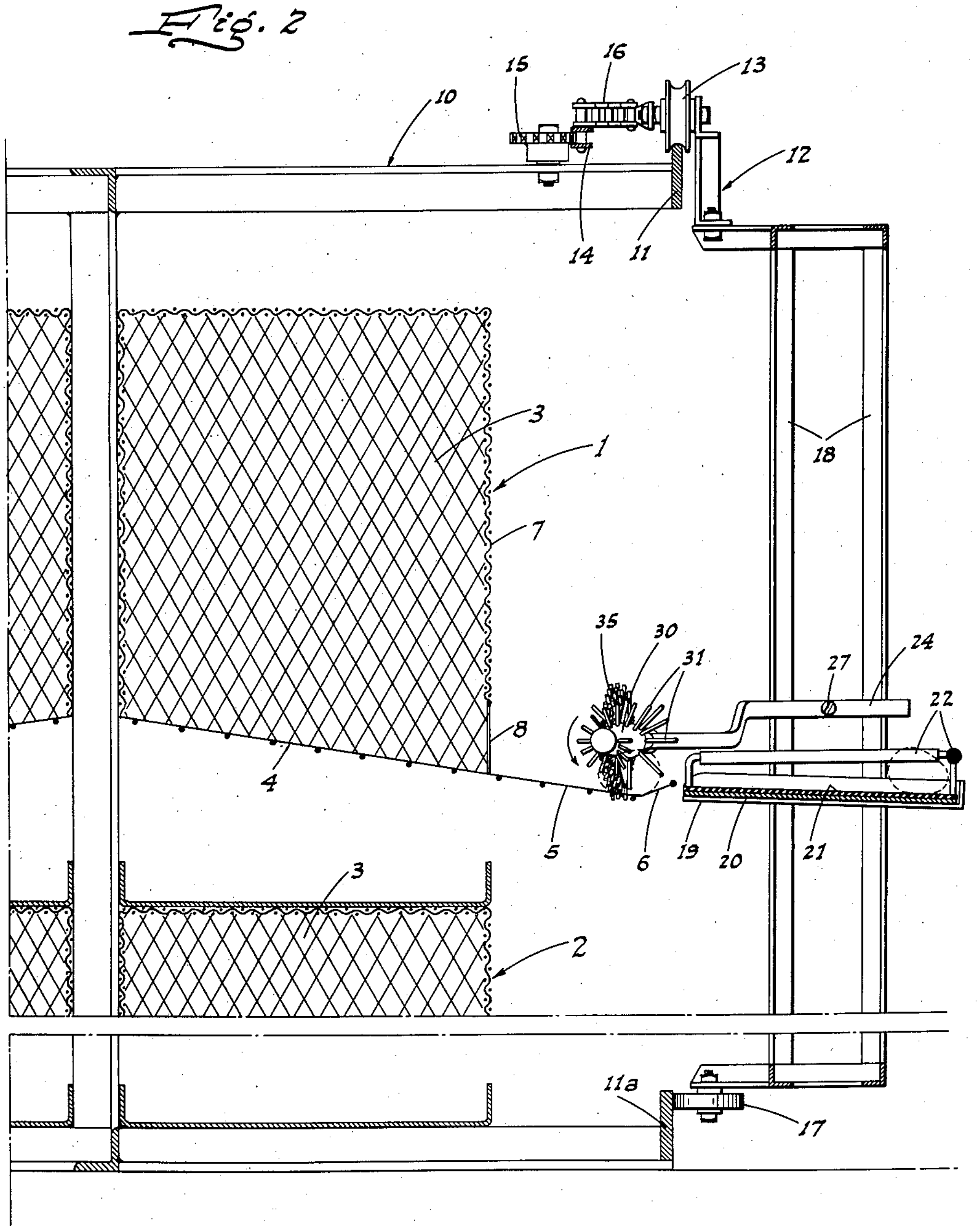
Fig. 2 is a vertical transverse section on line 3—3 of Fig. 1.

Each battery of cages 3 includes a wire-screen floor or bottom 4 common to all said cages. This bottom is disposed at a relatively slight forward and downward incline and projects ahead of the cage a short distance to form a trough or channel 5, which terminates along the front in a lip 6 having an upward slope, as shown in Fig. 2. The trough 5 is made of screening in which the crossing strands extend directly lengthwise and crosswise of the trough, as shown in Fig. 1.

The front wall 7, of the battery of cages, terminates at its lower edge short of the bottom 4 a sufficient distance to provide a continuous gap 8 (see Fig. 2) of a height to allow of free passage of eggs 9 therethrough, whereby eggs laid by the hens in the different cages 3 will roll of themselves into the trough 5 in position to be picked up or gathered by the apparatus now to be described, and which comprises the present invention.

Disposed above the topmost tier of cages is a framework, indicated generally at 10, and which includes a continuous horizontal top rail 11 disposed in a plane in front of the battery of cages and longitudinally parallel thereto.

Supported by the rail 11 is a depending rectangular carriage, indicated generally at 12, and having wheel trucks 13 riding said rail. The carriage is driven along the rail at a slow speed by means and in a manner generally common to poultry cage batteries of the type having a carriage movable in front thereof and which heretofore supported feeding and watering units or the like. Such drive means includes an endless horizontal driven chain 14 engaged with pulleys 15 mounted on frame 10; the chain being connected to one of the trucks 13 by a pull link 16.

The carriage extends below the trough 5 of the lowermost tier of cages, and at its lower end carries vertical-axis rollers 17 which bear against a fixed bottom rail **11*a* parallel to top rail 11**.

At each end the frame 12 includes end members comprised of a pair of transversely spaced uprights 18, each pair of which supports a cleat 19 extending transversely of the related tier of cages 3. The cleats are disposed against the sides of the end members which face each other.

A pair of such cleats 19 is provided for each tier of the cages, and removably support an egg tray 20 having a cushion bottom 21. The cleats are arranged to removably support the tray so that one edge thereof lies closely adjacent the outer edge of the lip 6, and with the adjacent edge of the cushion bottom 21 slightly lower than said outer edge of the lip. The tray 20 slopes slightly down in a direction away from the lip 6, as shown in Fig. 2, as well as down from its trailing end, as shown in Fig. 1.

Figure 3:
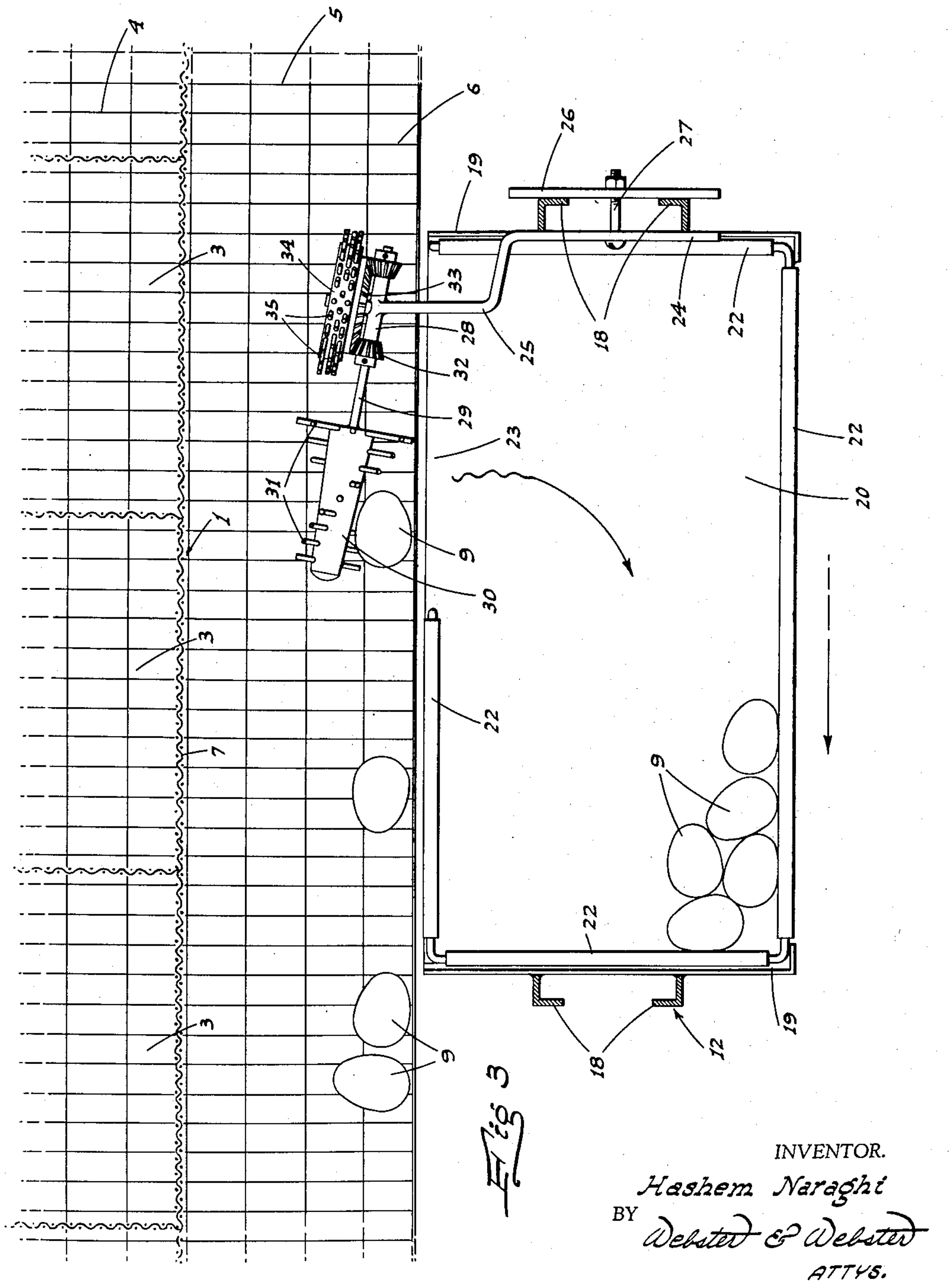
Fig. 3 is a sectional plan on line 3—3 of Fig. 1.

Cushioned egg-engaging rails 22 upstand from the tray about its edges; the front rail, or the one adjacent the lip 6, being omitted for a certain distance from the trailing end of the tray—with respect to the direction of travel of the carriage and tray along the battery of cages—to provide an egg entrance opening 23 from trough 5 into the tray, as shown in Fig. 3.

Eggs lying in the trough 5 are fed onto the tray 20, as the carriage moves along said trough, in the following manner:

Engaging one face of the trailing end uprights 18 of the carriage a short distance above the adjacent egg tray 20 is a transverse bar 24, which at one end overlies the trough 5 somewhat and at such end is preferably formed with a forwardly bent portion 25.

The bar 24 is clamped against the uprights 18, for both vertical and horizontal adjustment, by means of a cross bar 26 engaging the opposite face of the uprights and connected to bar 24 by a clamping bolt 27 disposed between the uprights, as shown in Fig. 3.

Secured on the end of bar 24 which overhangs the trough 5 is a horizontal bearing 28 for a shaft 29; the bearing—and shaft—being disposed at a slight acute angle, in a carriage advancing direction, to the longitudinal plane of the egg trough and lip.

Projecting from the leading end of the shaft is an egg sweep which comprises an elongated rotary body 30 of cylindrical or slightly frusto-conical form; the small end of the body being the leading end thereof. Projecting from the body are circumferentially spaced rows of flexible radial fingers 31 which increase in length from the leading to the trailing end of the row; the extent of such rows being materially less than a full helix.

The body 30 is disposed at such a level that the fingers 31 will engage any egg 9 lying in the trough 5 adjacent the lip 6; the longest fingers at the trailing end of the body just missing contact with the lip and the adjacent portion of the trough, as shown in Fig. 2.

The shaft 29 of the egg sweep is provided with a bevel pinion 32 engaged by a bevel gear 33 mounted on the bearing 28 at right angles to the axis of the shaft 29. Fixed with the bevel gear is a wheel 34 overhanging the trough 5 and having a multiplicity of flexible fingers or teeth 35 projecting radially therefrom and of a length to extend somewhat below the transverse wires of the trough screening. Said wires and fingers thus form in effect a rack and gear connection with each other.

In operation, as the carriage—with the egg sweep thereon—moves along the trough 5, the wheel 34 is rotated by contact of the fingers 35 with the wires of the trough 5. This causes rotation of the body 30 in such a direction that any egg disposed in the trough 5 and against the lip 6 will be engaged by the helical rows of radial fingers 31 and gently rolled and swept up the slope of such lip and thence over the rim thereof, through the tray opening 23, and onto the tray 20. The downward slope of the tray from the opening 23 toward the opposite outer side, as well as toward the leading end, insures that the eggs when once swept onto the tray will roll clear of said opening 23, so as not to interfere with the subsequent entry of eggs through such opening.

In the above manner eggs are automatically and effectively transferred from the trough onto the tray and then carried forward on the latter, the egg tray—at a predetermined point in the travel of the carriage 12, or at any time that the tray is full—being manually removed and an empty tray replaced.

While only one egg gathering apparatus is here shown, the carriage 12 will—in practice—support like apparatus adjacent and cooperating with each tier of the cages.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a poultry-cage battery which includes a row of poultry cages having a trough in front of and common to the row of cages and into which eggs laid in the cages roll; a carriage mounted in connection with the battery and movable along the row of cages in front of the trough, a tray carried by the carriages to receive the eggs from the trough, and means functioning upon movement of the carriage lengthwise of the trough to transfer eggs from the trough to the tray; said means comprising a sweep mounted on the carriage opposite the tray in overlying relation to the trough at a level to engage eggs thereon, said sweep extending lengthwise of the trough and being disposed at an acuate angle to the longitudinal plane of the trough in facing relation to the direction of movement of the carriage.

2. In a poultry-cage battery which includes a row of poultry cages having a trough in front of and common to the row of cages and into which eggs laid in the cages roll; a carriage mounted in connection with the battery and movable along the row of cages in front of the trough, a tray carried by the carriage to receive the eggs from the trough, the tray having an egg entry opening on the side nearest the trough, and a sweep mounted on the carriage, said sweep extending lengthwise relative to the direction of movement of the carriage and being arranged and positioned to engage eggs in the trough and sweep such eggs from the trough and onto the tray through the entry opening upon movement of the carriage along the trough.

3. In a poultry-cage battery which includes a row of poultry cages having a trough in front of and common to the row of cages and into which eggs laid in the cages roll; a carriage mounted in connection with the battery and movable along the row of cages in front of the trough, a tray carried by the carriage to receive the eggs from the trough, and a sweep mounted on the carriage arranged and positioned to engage eggs in the trough and sweep such eggs from the trough and onto the tray upon such movement of the carriage; said sweep comprising an elongated rotary body extending lengthwise of the trough in overlying relation and at a horizontal acute angle thereto, means mounting the body for rotation about its axis, flexible egg engaging fingers projecting from the body, and means to rotate the body upon such movement of the carriage, in a direction to cause eggs engaged by the fingers to be rolled laterally from the trough in the direction of the tray.

4. A device, as in claim 3, in which the means to rotate the body includes a toothed wheel operatively connected to the body with its axis horizontal and transversely of the trough and engaging the floor of the trough in relatively turnable relation.

5. A device, as in claim 3, with means supporting the sweep from the carriage for selective horizontal or lateral adjustment relative to the trough.

6. In a poultry-cage battery which includes a row of poultry cages having a trough in front of and common to the row of cages and into which eggs laid in the cages roll; a carriage mounted in connection with the battery and movable along the row of cages in front of the trough, a tray carried by the carriage to receive the eggs from the trough, and a sweep mounted on the carriage arranged and positioned to engage eggs in the trough and sweep such eggs from the trough and onto the tray upon such movement of the carriage; said sweep comprising a supporting bar mounted on and extending transversely of the carriage and overhanging the trough, a horizontal bearing member on the bar extending lengthwise of the trough at an acute angle thereto, a shaft turnable in the bearing, a wheel engaging and driven by the floor of the trough, said wheel being supported from the bearing member with its axis horizontal and transversely of the trough, an elongated body fixed on the shaft and extending axially thereof, sweep elements on the body to engage trough supported eggs in its path, and gearing connected between the wheel and shaft arranged to cause the body, as the wheel rotates upon such movement of the carriage, to rotate in a direction so that the eggs engaged by the sweep elements will be rolled laterally off the trough and onto the tray.

7. In a poultry-cage battery which includes a row of poultry cages having a trough in front of and common to the row of cages and into which eggs laid in the cages roll, a carriage mounted in connection with the battery and movable along the row of cages in front of the trough, a tray carried by the carriage to receive the eggs from the trough, and means functioning upon movement of the carriage lengthwise of the trough to transfer eggs from the trough to the tray; said means comprising a rotary sweep journaled on the carriage, said sweep extending lengthwise of and overhanging the trough at a forward acute diagonal and in adjacent but clearance relation thereto, and sweep rotating means including a carriage-supported wheel riding in the trough in frictional engagement with the bottom thereof and disposed rearwardly of the sweep with respect to the direction of advancing movement of the carriage.

8. In a poultry-cage battery which includes a row of poultry cages having a trough in front of and common to the row of cages and into which eggs laid in the cages roll, a carriage mounted in connection with the battery and movable along the row of cages in front of the trough, a tray carried by the carriage to receive the eggs from the trough, and means functioning upon movement of the carriage lengthwise of the trough to transfer eggs from the trough to the tray; said means comprising a rotary sweep extending lengthwise of the trough and journaled on the carriage and overhanging the trough at a forward acute diagonal and in adjacent but clearance relation thereto, and sweep rotating means comprising a carriage-supported wheel riding on the floor of the trough back of the sweep in rotating relation with the floor and disposed with its axis transversely thereof, and gear connections between the wheel and sweep to rotate the latter at a greater speed than the wheel.

References Cited in the file of this patent

UNITED STATES PATENTS

| | | |
|---|---|---|
| 683,413 | Reynolds | Sept. 24, 1901 |
| 2,314,344 | Cornell | Mar. 23, 1943 |
| 2,586,981 | Nagel | Feb. 26, 1952 |
| 2,756,721 | Hayes | July 31, 1956 |